United States Patent

Cadeddu

Patent Number: 5,143,469
Date of Patent: Sep. 1, 1992

[54] RETENTION SOCKET FOR A PIVOT

[75] Inventor: Leonardo Cadeddu, Crema, Italy

[73] Assignee: Bendix Italia, Crema, Italy

[21] Appl. No.: 731,607

[22] Filed: Jul. 17, 1991

[30] Foreign Application Priority Data

Aug. 3, 1990 [IT] Italy ................ 67616 A/90

[51] Int. Cl.$^5$ .................................... F16C 11/00
[52] U.S. Cl. .................... 403/133; 403/135; 403/140; 403/143
[58] Field of Search .......... 403/133, 135, 132, 140, 403/141, 122, 143

[56] References Cited

U.S. PATENT DOCUMENTS

| | | | |
|---|---|---|---|
| 4,194,850 | 3/1980 | Cranmore | 403/140 |
| 4,197,027 | 4/1980 | Scheerer | 403/133 X |
| 4,560,368 | 12/1985 | Sherman, II et al. | 464/112 |
| 4,894,754 | 1/1990 | Levilain | 403/140 X |

FOREIGN PATENT DOCUMENTS

| | | | |
|---|---|---|---|
| 971082 | 9/1964 | United Kingdom | 403/140 |
| 212852 | 7/1983 | United Kingdom | 403/135 |

*Primary Examiner*—Peter M. Cuomo
*Attorney, Agent, or Firm*—Larry J. Palguta; Ken C. Decker

[57] ABSTRACT

A socket (21) for retaining a pivot-forming spherical head (3) of a rod (1) in a cavity (5) is of substantially cylindrical shape having an annular groove (9). It consists of a first part (23) of hemispherical shape matched to the spherical head (3) a second part (25) of cylindrical shape matched to the shape of the cavity (5) and a third part (27) of substantially frustoconical shape, the free end (29) of which has a diameter larger than that of the cavity (5), longitudinal slots (31) being made in the second and third parts (25, 27), and the socket (21) being produced from an elastic material, such as a hard thermoplastic.

3 Claims, 1 Drawing Sheet

RETENTION SOCKET FOR A PIVOT

BACKGROUND OF THE INVENTION

The present invention relates to a socket for retaining the pivot-forming spherical head of a rod in a cavity of substantially cylindrical shape.

Such a socket can be used in any system for coupling two components having a degree of pivoting freedom. For example, in vacuum boosters used for assisting the braking of motor vehicles, the push rod connected to the pedal is not displaced strictly in the axis of the booster. It is therefore necessary to provide a pivot connection between the piston of the booster and the push rod. This is also true of the push rod of a clutch or pump.

Where a brake booster is concerned, FR-A-2,132,063 describes the use of a counter-pivot made of elastomeric material, some of which flows into a groove made in the cavity when the spherical head of the push rod is introduced into the cavity. Such a counter-pivot is perfectly suitable if no appreciable tearing force is exerted on the push rod.

DE-A-3,308,042 overcomes the problem of tearing by means of a blocking element consisting of a segmental collar. This solution remains costly, especially in terms of the assembly time.

An object of the present invention is to provide a socket for retaining the pivot-forming spherical head of a rod, such that the rod withstands an appreciable tearing force, the socket moreover having to be economical and easy to install.

SUMMARY OF THE INVENTION

According to the invention, the socket consists of a first part of hemispherical shape matched to the spherical head of the rod, a second part of cylindrical shape matched to the shape of the cavity and a third part of substantially frustoconical shape, the free end of which has a diameter larger than that of the cavity, longitudinal slots being made in the second and third parts, the socket being produced from an elastic material.

BRIEF DESCRIPTION OF THE DRAWINGS

The invention will now be described by way of example with reference to the accompanying drawings in which.

DETAILED DESCRIPTION OF THE INVENTION

Figure 1:
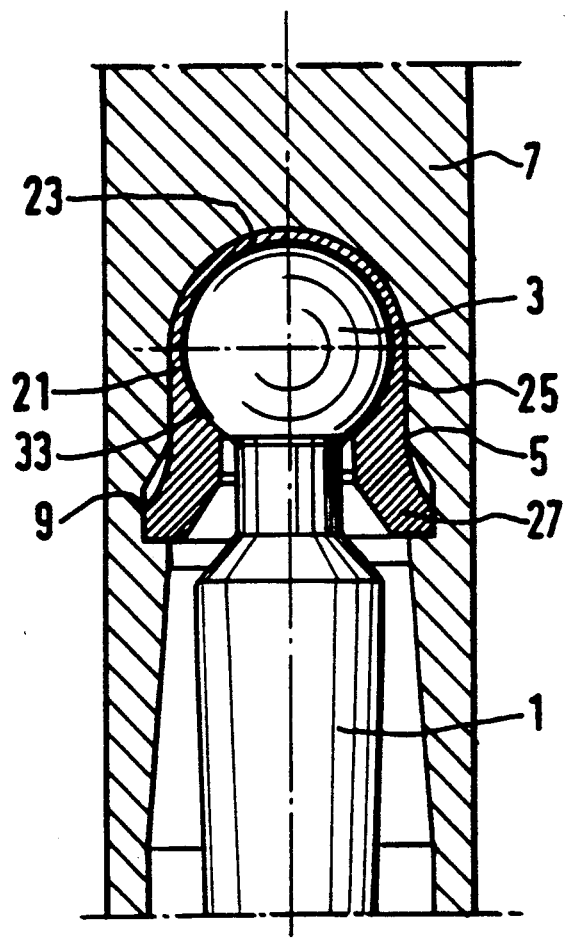
FIG. 1 shows diagrammatically, in section, a socket according to the invention used in a pivot coupling.
Figure 2:
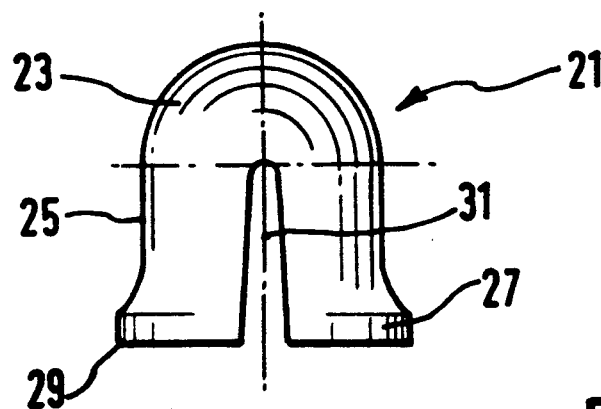
FIG. 2 shows diagrammatically, a view from the outside of a socket before its use.

Referring now to the figures, a push rod 1 has a head 3 of spherical shape at its end. This head 3 penetrates into a cavity 5, provided, for example, in a piston 7. This cavity 5 has a substantially cylindrical wall, and in the example illustrated, terminates in a hemispherical bottom.

An annular groove 9 has been made in the substantially cylindrical part of the cavity 5.

The socket 21 has been produced from a hard thermoplastic of some elasticity but could just as well be produced from a thin steel sheet. It essentially comprises a first part 23 of hemispherical shape corresponding to that of the head 3 of the rod 1 and intended for receiving this. Then, a second part 25 assumes a substantially cylindrical shape in the extension of the first part 23. Finally a third part 27 assumes a substantially frustoconical shape, the free end 29 of which has a diameter larger than that of the cylindrical part of the cavity 5.

Longitudinal slots 31, for example four in number, are made in the second and third parts 25, 27, so as to afford a possibility of elastic deformation of the open end of the socket 21.

In the example illustrated, where the socket is produced from a hard thermoplastic, the inner wall 33 of the second part 25 of the socket 21 assumes a partially spherical shape extending the first part 23.

In practice, the socket 21 is first arranged on the head 1, onto which it snaps naturally. The assembly is then introduced into the cavity, the third part 27 of the socket being deformed elastically so as to penetrate into the cavity 5. When it reaches the annular groove 9, this third part 27 expands elastically and penetrates into the groove.

The assembly is thus permanently captive in the cavity.

By carefully adjusting the dimensions of the cavity, of the head, of the socket and of the groove, an average person skilled in the art can thus easily obtain a pivot coupling which minimizes play and friction.

Furthermore, the use of a thermoplastic makes it possible to produce the socket extremely simply, and moreover, has the advantage of avoiding problems of corrosion inherent in the coupling of two metal components and problems of noise attributable to metal components striking each other, and of having highly durable lubrication.

Of course, many modifications can be made to the present invention without departing from the scope defined by the accompanying claims.

What we claim is:

1. A socket for retaining a pivot-forming spherical head of a rod in a cavity of substantially cylindrical shape and having an annular groove, said socket comprising a first part of hemispherical shape matched to said spherical head, a second part of cylindrical shape matched to the shape of said cavity, a third part of substantially frustoconical shape a free end of which has a diameter larger than that of said cavity in order to penetrate into said annular groove, and longitudinal slots in said second and third parts, said socket being produced from an elastic material, the socket providing a permanent automatic assembly of the spherical head and socket in said cavity by which the socket fits resiliently over the spherical head and both socket and spherical head are inserted into the cavity until the third part is deformed resiliently inwardly by a surface of the cavity and then expands resiliently outwardly into said annular groove such that the assembly is permanently captured in the cavity.

2. The socket according to claim 1, wherein the inner wall of the second part assumes a partially spherical shape extending said first part.

3. The socket according to claim 1, wherein the socket is produced from a hard thermoplastic.